US008549040B2

(12) United States Patent
Forsberg et al.

(10) Patent No.: US 8,549,040 B2
(45) Date of Patent: Oct. 1, 2013

(54) IP MULTIMEDIA SUBSYSTEM SERVICE CONFIGURATION

(75) Inventors: Mikael Forsberg, Tyreso (SE); Lennart Norell, Alvsjo (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/255,660

(22) PCT Filed: Mar. 10, 2009

(86) PCT No.: PCT/EP2009/052808
§ 371 (c)(1),
(2), (4) Date: Sep. 9, 2011

(87) PCT Pub. No.: WO2010/102664
PCT Pub. Date: Sep. 16, 2010

(65) Prior Publication Data
US 2012/0005157 A1    Jan. 5, 2012

(51) Int. Cl.
*G06F 17/30* (2006.01)
(52) U.S. Cl.
USPC .......................................... 707/793; 707/803
(58) Field of Classification Search
USPC ................................................ 707/793, 803
See application file for complete search history.

(56) References Cited

U.S. PATENT DOCUMENTS

| | | | |
|---|---|---|---|
| 6,826,568 B2 * | 11/2004 | Bernstein et al. | 707/749 |
| 6,917,935 B2 * | 7/2005 | Zwiegincew et al. | 707/803 |
| 7,016,902 B2 * | 3/2006 | El-Shimi et al. | 379/88.12 |
| 7,181,456 B2 * | 2/2007 | Huang | 707/803 |
| 7,246,131 B2 * | 7/2007 | Lehmann et al. | 707/748 |
| 7,349,912 B2 * | 3/2008 | Delany et al. | 707/694 |
| 7,392,259 B2 * | 6/2008 | Lee et al. | 715/234 |
| 7,406,478 B2 * | 7/2008 | Agrawal et al. | 707/803 |
| 2006/0182129 A1 | 8/2006 | Mutch | |
| 2008/0114799 A1 * | 5/2008 | Chasen | 707/101 |
| 2009/0030902 A1 * | 1/2009 | Aharoni et al. | 707/6 |

* cited by examiner

*Primary Examiner* — Kim Nguyen (57) ABSTRACT

According to a first aspect of the present invention there is provided a method of operating an XML Document Management Server in an IP Multimedia Subsystem. The method comprises receiving a message from a user terminal requesting an XML document, the XML document conforming to a given structure and containing one or more service rules relating to a service, retrieving an XML document containing said service rules from a data storage entity. If the structure of the retrieved XML document differs from said given structure, adapting a rule or rules of the retrieved XML document such that the XML document conforms to said given structure, and sending the adapted XML document to the user terminal.

12 Claims, 8 Drawing Sheets

```
<ss:communication-diversion active="true">
  <cp:ruleset>
    <cp:rule id="meetings">
      <cp:conditions>
        <cp:presence-status>meeting</cp:presence-status>
      </cp:conditions>
      <cp:actions>
        <forward-to>
          <target>sip:voicemail@example.com</target>
        </forward-to>
      </cp:actions>
    </cp:rule>
  </cp:ruleset>
</ss:communication-diversion>
```

Figure 6

```
<ss:communication-diversion-basic active="true">
  <cp:ruleset>
    <cp:rule id="meetings">
      <cp:conditions>
        <ss_basic:complex/>
      </cp:conditions>
      <cp:actions>
        <forward-to>
          <target>sip:voicemail@example.com</target>
        </forward-to>
      </cp:actions>
    </cp:rule>
  </cp:ruleset>
</ss:communication-diversion>
```

IP MULTIMEDIA SUBSYSTEM SERVICE CONFIGURATION

TECHNICAL FIELD

The present invention relates to the configuration of IP Multimedia Subsystem services, and in particular to the configuration of such services by users across the Ut interface.

BACKGROUND

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The UMTS (Universal Mobile Telecommunications System) is a third generation wireless system designed to provide higher data rates and enhanced services to users. UMTS is a successor to the Global System for Mobile Communications (GSM), with an important evolutionary step between GSM and UMTS being the General Packet Radio Service (GPRS). GPRS introduces packet switching into the GSM core network and allows direct access to packet data networks (PDNs). This enables high-data rate packets switch transmissions well beyond the 64 kbps limit of ISDN through the GSM call network, which is a necessity for UMTS data transmission rates of up to 2 Mbps. UMTS is standardised by the 3rd Generation Partnership Project (3GPP) which is a conglomeration of regional standards bodies such as the European Telecommunication Standards Institute (ETSI), the Association of Radio Industry Businesses (ARIB) and others. See 3GPP TS 23.002 for more details.

The UMTS architecture includes a subsystem known as the IP Multimedia Subsystem (IMS) for supporting traditional telephony as well as new IP multimedia services (3GPP TS 22.228, TS 23.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet.

The IMS makes use of the Session Initiation Protocol (SIP) to set up and control calls or sessions between user terminals (or terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

Figure 1:
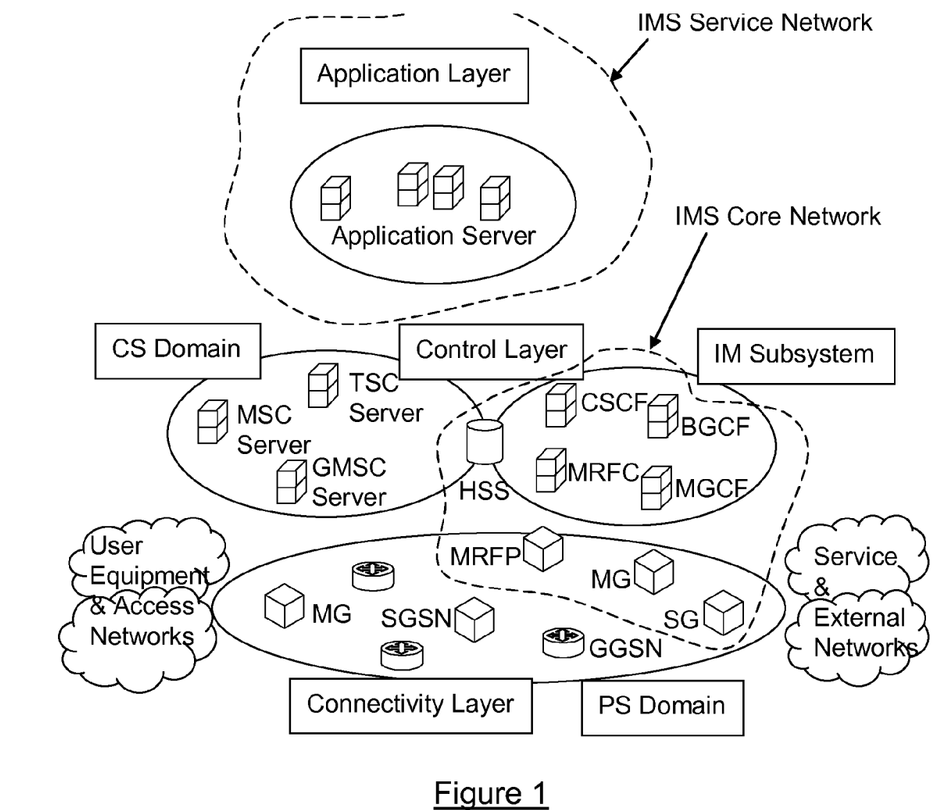
FIG. 1 illustrates schematically the mobile network architecture of a GPRS/PS access network.

By way of example, FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

Within the IMS service network, Application Servers (ASs) are provided for implementing IMS service functionality. Application Servers provide services to end users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from an HSS during the IMS registration procedure as part of a user's Subscriber Profile.

The user-specific information related to the services provided by ASs is stored in XML document format. A Ut interface (or "reference point") has been specified between ASs and user terminals (TS23.002) that allows a user terminal to operate as an XML Document Management Client (XDMC) in order to manipulate the XML documents, therefore allowing users to define how their services are provisioned.

ETSI TISPAN has adopted the XML Configuration Access Protocol (XCAP), as specified in IETF RFC4825, for use over the Ut interface and which facilitates the use of HTTP methods, i.e. GET, PUT, and DELETE, on the elements and attributes of an XML document as identified by a Request-URI. ETSI 183 023 presents a refined XCAP protocol for manipulating data relating specifically to PSTN/ISDN simulation services that will be provisioned within Next Generation Networks (NGN).

Each application or service that makes use of XCAP defines its own XCAP application usage. The application usage for a service defines an ID for the application usage, the structure of the XML document or a fragment of the XML document that for that service, using an XML schema, as well as defining other key pieces of information. The XML schema defines the elements and attributes of an XML document and the data type for those elements and attributes. An XML document will contain a reference to a file containing the XML schema for that document. 3GPP TS24.623 defines an application usage for supplementary services. The simservs XML document contains the data associated with one or more supplementary services, and the XML schema for this document defines the structure as comprising of a common part and a number of XML fragments corresponding to each of the supplementary services. Each XML fragment affects the settings of a supplementary service (or group of services).

XML documents are handled by XML Document Management Servers (XDMS) which are typically implemented in or co-located with ASs. For example, an XDMS responsible for handling service data relating to Multimedia Telephony (MMTel) services might be co-located with a Multimedia Telephony Application Server (MTAS). An XDMS is a HTTP origin server that manipulates the elements and attributes of an XML document according to the conventions described in RFC4825. In use, an XDMS stores service data into the HSS (as transparent data) which is then retrieved by the AS at service invocation.

Figure 2:
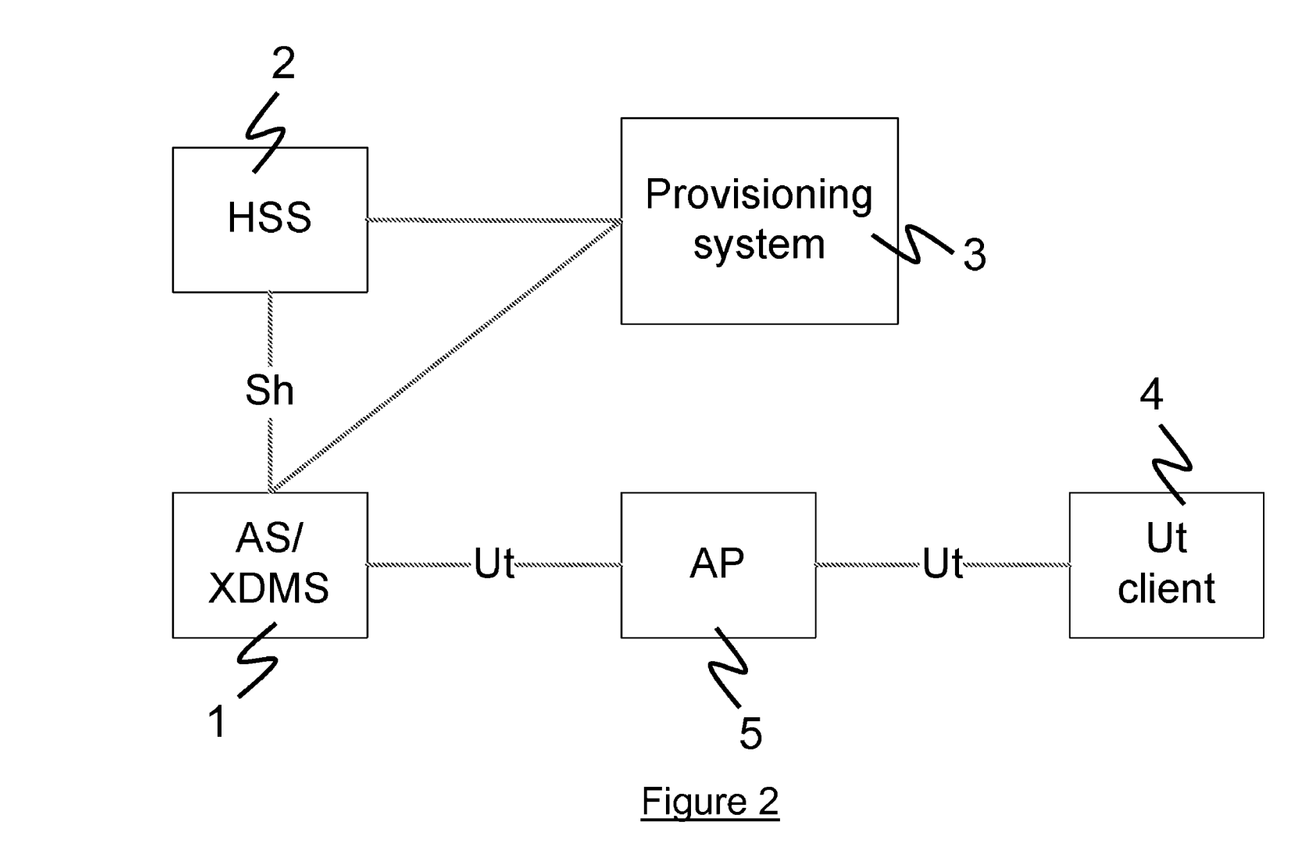
FIG. 2 illustrates schematically an IMS XML document management network according to the prior art.

FIG. 2 illustrates schematically the IMS XML document management network. The XML documents defining customer services and settings are handled by the AS/XDMS 1. The Sh interface allows the XDMS to communicate with the Home Subscriber Server (HSS) 2. A provisioning system 3 allows a network operator to initially install pre-configured XML documents, based upon the standardised XML schema, on a per-user basis into the HSS, and to subsequently amend the installed XML documents via the XDMS. The management network additionally provides a mechanism whereby a user can edit his/her associated XML document. For this purpose, a Ut client 4 is installed within the user terminal. As discussed above, the Ut client uses the XCAP protocol to retrieve (either the whole document or a fragment thereof) and amend the XML documents (or fragment). It will be appreciated that the XDMS reacts to a retrieval request from a UE by obtaining the relevant XML documents or fragment from the HSS and delivering this to the UE over the Ut interface.

An Aggregation Proxy (AP) 5 is arranged to "intercept" XCAP traffic flowing between the Ut client 4 and the XDMS. The role of the AP is firstly to authenticate user originating requests and in particular to determine if a particular user has the right to access the XDMS. Secondly, the AP provides a common point of connection for a Ut client, distributing XCAP requests to appropriate XDMSs.

The Ut client fetches the stored data from the XDMS by sending a XCAP GET request to the XDMS over the Ut interface (assuming authorisation by the AP and redirection by any aggregation point). The XDMS fetches the data from the HSS over the Sh interface and sends it back to the Ut client in a Ut response message. The Ut client displays information and options to the user via a Graphical User Interface (GUI).

SUMMARY

According to a first aspect of the present invention there is provided a method of operating an XML Document Management Server in an IP Multimedia Subsystem. The method comprises receiving a message from a user terminal requesting an XML document, the XML document conforming to a given structure and containing one or more service rules relating to a service, retrieving an XML document containing said service rules from a data storage entity. If the structure of the retrieved XML document differs from said given structure, adapting a rule or rules of the retrieved XML document such that the XML document conforms to said given structure, and sending the adapted XML document to the user terminal.

The method provides that any service data can be sent to a user terminal in a structure suited to the capabilities of that terminal. Furthermore, this will allow a user terminal to read and manipulate service data when new services and/or additional parameters are added in the user's core network. In other words, a user's ability to manipulate their service data is not restricted by the capabilities of the user terminal.

Prior to receiving said message requesting an XML document, the method may also comprise receiving a message from the user terminal requesting a list of the XML documents available for the service, and sending a message to the user terminal including a list of XML documents the XML Document Management Server can provide for said service, the XML documents in the list presenting said service rules in respective different structures.

The step of adapting a rule or rules of the retrieved XML document may comprise replacing or removing those elements or attributes of the rule or rules of the retrieved XML document that differ from elements or attributes of the rule or rules of the given structure. The given structure may be structure supported by the user terminal. As such, the XML document with the required structure will be selected based on the user terminals capabilities. As such, those elements or attributes of the rule or rules of the retrieved XML document that differ from elements or attributes of the rule or rules of the given structure, will relate to services or service levels not supported by the user terminal. Those elements or attributes of the rule or rules of the retrieved XML document that differ from elements or attributes of the rule or rules of the given structure may be replaced with one or more parameters that are supported by the user terminal.

According to a second aspect of the present invention there is provided a method of operating an XML Document Management Server. The method comprises receiving a message from a user terminal including an XML document containing one or more service rules relating to a service, and requesting that said XML document be stored, and, if the structure of the received XML document differs from the structure of an XML document relating to that service stored at a data storage entity, adapting a rule or rules of the received XML document such that the structure conforms to that of the stored XML document, and storing the adapted XML document at the data storage entity.

The step of adapting the received XML document may comprise replacing or removing those elements or attributes of the rule or rules of the received XML document that differ from elements or attributes of the rule or rules of the stored XML document. The structure of the XML document received from the user terminal may be a structure supported by the user terminal. As such, those elements or attributes of the rule or rules of the received XML document that differ from elements or attributes of the rule or rules of the stored XML document may relate to services or service levels not supported by the user terminal. Those elements or attributes of the rule or rules of the retrieved XML document that differ from elements or attributes of the rule or rules of the given structure may be replaced with one or more generic parameters that are supported by the user terminal.

Communication between the user terminal and the XML Document Management Server may use a Ut interface. If such communication between the user terminal and the XML Document Management Server relates to service data in an XML document, this communication may use the XML Configuration Access Protocol. The structure of an XML document may be defined by an XML schema.

The data storage entity may be a Home Subscriber Server, and communication between the XML Document Management Server and the Home Subscriber Server may use a Sh interface.

According to a third aspect of the present invention there is provided a method of operating a user terminal. The method comprises sending a message to an XML Document Management Server requesting a list of the XML documents available for a service, receiving a message from the XML Document Management Server including a list of XML documents, the XML documents in the list presenting a rule or rules of said service in respective different structures, selecting an XML document from the list of XML documents, the selected XML document conforming to a structure supported by the user terminal, and sending a message to the XML Document Management Server requesting the selected XML document.

According to a fourth aspect of the present invention there is provided an apparatus configured to operate as an XML Document Management Server in an IP Multimedia Subsystem. The apparatus comprises a receiver for receiving a message from a user terminal requesting an XML document, the XML document conforming to a given structure and containing one or more service rules relating to a service, a transceiver for retrieving an XML document containing said service rules from a data storage entity, a processing unit for determining if the structure of the retrieved XML document differs from said given structure and, if so, for adapting a rule or rules of the retrieved XML document such that the structure conforms to said given structure, and a transmitter for sending a message including the adapted XML document to the user terminal.

The apparatus may further comprise a receiver for receiving a message from the user terminal requesting a list of the XML documents available for said service, and a transmitter for sending a message to the user terminal including a list of XML documents, each of the XML documents in the list representing a different XML document structure in which the application server can provide said service rule or rules.

According to a fifth aspect of the present invention there is provided an apparatus configured to operate as an XML Document Management Server in an IP Multimedia Subsystem. The apparatus comprises a receiver for receiving a message from a user terminal including an XML document and requesting that the XML document be stored, the XML document containing one or more service rules relating to a service, a processor unit for determining if the structure of the received XML document differs from the structure of an XML document relating to that service stored at a data storage entity and, if so, for adapting a rule or rules of the received XML document such that the structure matches that of the stored XML document, and a transmitter for storing the adapted XML document at the data storage entity.

According to a sixth aspect of the present invention there is provided user terminal for use with an IP Multimedia Subsystem. The user terminal comprises a transmitter for sending a message to an XML Document Management Server requesting a list of the XML documents available for a service, a receiver for receiving a message from the XML Document Management Server including a list of XML documents, each of the XML documents in the list presenting a rule or rules of said service in respective different structures, a processor unit for selecting an XML document from the list of XML documents, the selected XML document conforming to a structure supported by the user terminal, and a transmitter for sending a message to the XML Document Management Server requesting the selected XML document.

DETAILED DESCRIPTION

It is recognised here that a user terminal can take the form of any one of a number of different types of device. For example, the terminal could be a personal computer (PC), a mobile phone or a smart phone. Furthermore, within each device type there a large variety of devices that could be available to a user, with each device having different capabilities. As such, a user may make use of a terminal that has only limited capabilities, and that therefore may limit the user's ability to view and/or manipulate their service data (e.g. due to screen size (GUI) or the software installed on the device). This is particularly problematic for users who make use of both a device that allows them to access and modify all their available service data, and another device whose capabilities are limited such that they can only access and modify a subset of the available service data. In addition, even those user terminals that support all currently available network services may not be able to support new and/or enhanced services that will be introduced by the networks in the future.

There will now be described a method by which a user can access and modify all of their IMS service data from a user terminal with limited capabilities. The method involves making use of an Application Server (AS)/XML Document Management Server (XDMS) that can provide service data to a user terminal in a structure suited to the capabilities of that terminal.

Figure 3:
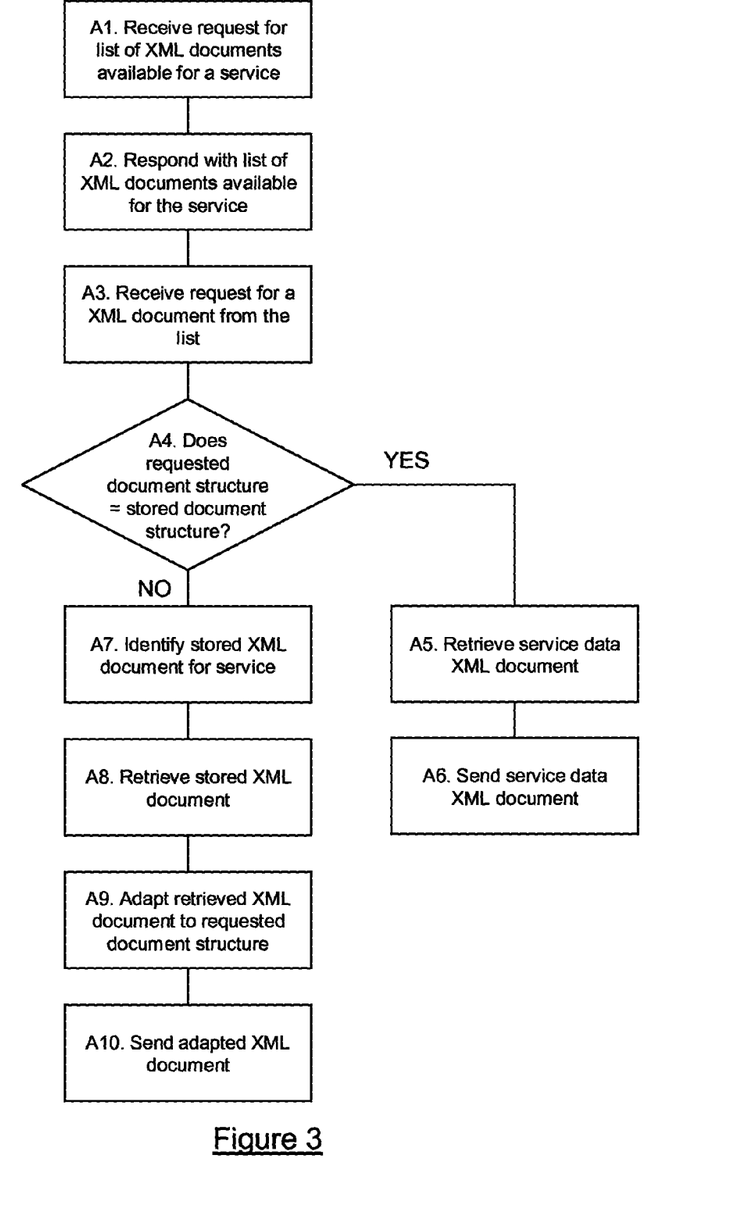
FIG. 3 is a flow diagram illustrating an example of the process implemented by an AS when it is required to provide service data to a user terminal.

FIG. 3 illustrates an example of the process implemented by an AS/XDMS when it is required to provide service data to a user terminal. The steps performed are as follows:

A1. The AS/XDMS receives a GET request from a user terminal (or XCAP Client) over the Ut interface. The request is targeted at a specific service (i.e. Application Usage ID (AUID)) in order to request details of the different documents or document fragments that the AS/XDMS can provide for the identified service.

A2. The AS/XDMS responds to this request over the Ut interface with an XML document containing a list of the different XML documents that it can provide for the specified service. The XML document will include a URI or Document Selector for each of the XML documents in the list. All of the documents in the list represent the same service such that the same service data will be retrieved from the HSS for each document; however, each document represents a different structure or XML schema in which the relevant service data can be provided to the user terminal.

A3. The AS/XDMS then receives another GET request from the user terminal. The GET request includes the URI of an XML document selected from the list by the user terminal, as providing a document suited to the terminals capabilities.

A4. The AS/XDMS makes use of the URI in the GET request to determine the XML schema of the XML document that has been requested by the user terminal and, in particular, whether this differs from the XML schema of the XML document containing the service data as stored in the HSS.

A5. If the XML schema of the XML document requested by the user terminal is the same as the XML schema of the XML document stored in the HSS, then the AS/XDMS retrieves the document or fragment for the service data from the HSS over the Sh interface.

A6. The AS/XDMS then sends a 200 OK response to the user terminal including, in the message body, the retrieved XML document or fragment.

A7. If the XML schema of the XML document requested by the user terminal differs from the XML schema of the XML document stored in the HSS, then the AS/XDMS determines the XML document or fragment for the service data that is stored in the HSS.

A8. The AS/XDMS then retrieves the XML document or fragment from the HSS over the Sh interface.

A9. The AS/XDMS then adapts the document or fragment retrieved from the HSS such that the XML document matches the XML schema requested by the user terminal. This can be achieved by applying a set of rules or filters to the XML document or document fragment retrieved from the HSS. These rules or filters can cause the rules within the service document that are not supported by the user terminal to be replaced by a parameter that the user terminal will understand.

A10. The AS/XDMS then sends a 200 OK response to the user terminal including, in the message body, an XML document containing the service data in the requested XML schema.

Figure 4:
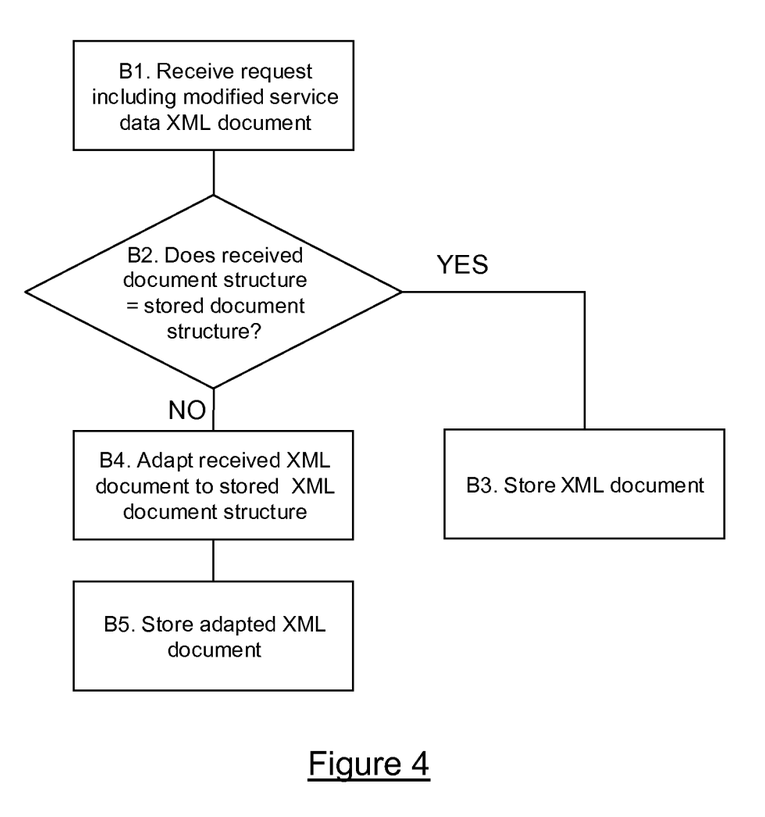
FIG. 4 illustrates an example of the process implemented by an AS when it receives an XML document containing modified service data set from a user terminal.

FIG. 4 illustrates an example of the process implemented by an AS when it subsequently receives an XML document containing modified service data set from a user terminal. The steps performed are as follows:

B1. The AS/XDMS receives a PUT request from a user terminal. The PUT request includes an XML document in which the service data has been modified at the user terminal.

B2. The AS/XDMS uses the filename/file path of the XML document received from the user terminal to determine both the service that the XML document relates to, and the XML schema of the XML document. In doing so, the AS/XDMS determines whether the XML schema of the received XML document differs from the XML schema of the XML document for that service which is stored in the HSS.

B3. If the XML schema of the XML document received from the user terminal is the same as that of the XML document or fragment stored in the HSS, then the AS/XDMS stores this XML document received from the user terminal at the HSS. In doing so the AS/XDMS replaces the service data stored in the XML document at the HSS with the modified service data received from the user terminal.

B4. If the XML schema of the XML document received from the user terminal differs from that of the XML document or fragment stored in the HSS, then the AS/XDMS adapts the XML document received from the user terminal such that it matches the XML schema of the XML document or fragment stored at the HSS.

B5. The AS/XDMS then stores the XML document containing the modified service data at the HSS.

Figure 5:
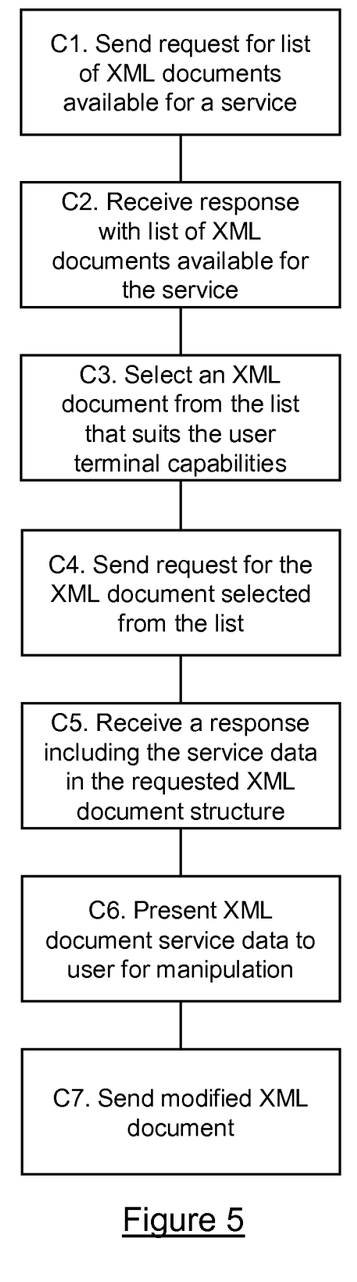
FIG. 5 illustrates an example of the process implemented by a user terminal when modifying service data.

FIG. 5 illustrates an example of the process implemented by a user terminal when it is required to modify service data. The steps performed are as follows:

C1. The user terminal sends a GET request to the AS/XDMS over the Ut interface. The request is targeted at a specific service (i.e. Application Usage ID (AUID)) in order to request details of the different documents or document fragments that the AS/XDMS can provide for the identified service.

C2. The user terminal receives a response from the AS/XDMS over the Ut interface with an XML document containing a list of the different XML documents that it can provide for the specified service. The XML document will include a URI or Document Selector for each of the XML documents in the list. Each document represents a different XML schema in which the relevant service data can be provided to the user terminal.

C3. The user terminal then selects one of the XML documents from the list that provides the service data in an XML document suited to the terminals capabilities.

C4. The user terminal then sends a GET request to the AS/XDMS over the Ut interface including the URI of the selected document.

C5. The user terminal then receives a 200 OK response from the AS/XDMS including, in the message body, an XML document containing the service data in the requested XML schema. For example, the received XML document may contain parameters that have been replaced those parameters that are not supported by the user terminal.

C6. The user terminal then presents the service data from the XML document, including the rules containing the replaced parameters, to the user via a Graphical User Interface (GUI). The user can then manipulate/modify the service settings.

C7. Once the user has finished manipulating the service data, the user terminal sends a PUT request to the AS/XDMS over the Ut interface. The PUT request includes the XML document containing the service data modified by the user in the same XML schema as the document received from the AS/XDMS.

The method described above provides that a low-end user terminal with limited capabilities will be able to read and manipulate any of a user's service data even when the service set includes advanced services that the terminal would not normally support. For example, if the XDMS supports more than one XML schema for the same service, then the terminal will be able to understand and make use of at least one of these.

Furthermore, this will allow a user terminal to read and manipulate service data when new services and/or additional parameters are added in the user's core network. In other words, a user's ability to manipulate their service data is not restricted by the capabilities of the user terminal. For example, in case where an existing service is enhanced with new features, the AS/XDMS will be able to provide a new XML document for that service which includes the additional feature(s), but will also be able to provide an adapted XML document for those user terminals that do not explicitly support these additional features.

By way of example, consider a scenario in which the IMS network supports the Communication Diversion (see 3GPP TS24.604) service. A user initially configures their Communication Diversion (CDIV) rules from a web portal that supports CDIV. Subsequently the user wishes to manipulate the service data for this service from another terminal; however, this terminal does not support CDIV services wherein communication diversion is based on presence.

In this case, the user terminal sends a message to the appropriate AS/XDMS requesting details of the XML documents that can be provided by that AS/XDMS for the CDIV service. The AS/XDMS responds with URIs of two documents, a communication-diversion document and a communication-diversion-basic document.

The user terminals capabilities are such that it will not understand the communication-diversion XML document, which represents the normal XML schema for the XML document for this service. However, the user terminal determines that it will understand the communication-diversion-basic XML document and therefore requests this XML document from the AS/XDMS using its URI. The AS/XDMS determines that the XML document requested by the user terminal makes use of a different XML schema than that in which the service data is stored at the HSS. The AS/XDMS identifies the user's CDIV XML document and retrieves this from the HSS over the Sh interface.

Figure 6:
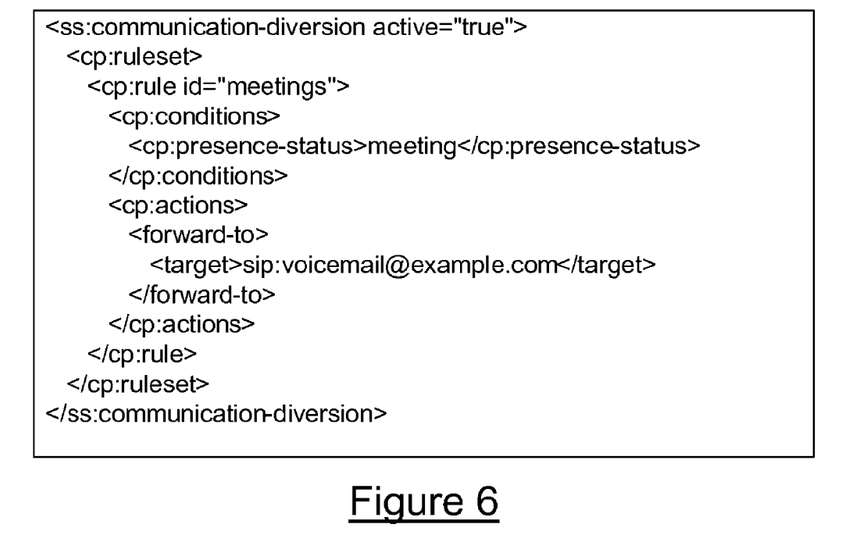
FIG. 6 illustrates an example of the CDIV service data in the XML schema in which this data is stored at the HSS.

FIG. 6 illustrates an example of the CDIV service data in the XML schema in which it is stored at the HSS, and that retrieved by the AS/XDMS. In order to adapt this XML document into the communication-diversion-basic XML schema that can be understood by the user terminal, the AS/XDMS applies the appropriate set of rules or filters.

Figure 7:
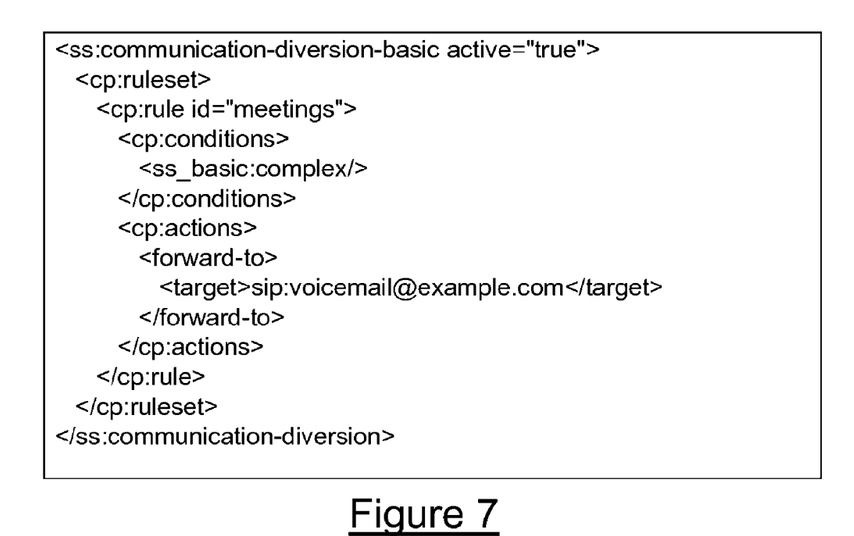
FIG. 7 illustrates the CDIV service data when converted into the communication-diversion-basic XML schema by the AS/XDMS.

In this case, the CDIV XML document contains a rule set specifying that when the user's "presence-status" is set to "meeting" a call will be forwarded to the user's voicemail. However, the AS/XDMS determines that the communication-diversion-basic schema does not support the "presence-status" condition, and defines that this should therefore be replaced with a parameter, "ss_basic: complex". The user terminal is able to understand and present this "ss_basic: complex" parameter such that it can be used to replace those parameters relating to the services not supported by the user terminal. FIG. 7 illustrates the CDIV service data when converted into the communication-diversion-basic XML schema by the AS/XDMS.

The XML document, adapted to the communication-diversion-basic XML schema, is then sent to the user terminal. Given that the user terminal can understand the "ss_basic: complex" parameter, whereas it would not have understood the "presence-status" condition, the user terminal can display the parameters for this condition (such as the "rule id", "target address" and "actions" elements) and allow the user to manipulate these parameters.

Once the user has finished manipulating the service data the user terminal sends a PUT request to the AS/XDMS including the XML document containing the modified service data in the communication-diversion-basic XML schema. The AS/XDMS applies the appropriate set of rules or filters to adapt the XML document from the communication-diversion-basic XML schema to the communication-diversion XML schema, in which the XML document is stored in the HSS. The AS/XDMS therefore replaces the "ss_basic: complex" parameter with the original "presence-status" condition. This XML document including the modified service data is then stored at the HSS. If the user then accesses the CDIV service data from a user terminal that supports CDIV based on presence (e.g. via the web portal used to initially configure the service), the user will observe that the service data has changed in accordance with the modifications made via the other user terminal.

Figure 8:
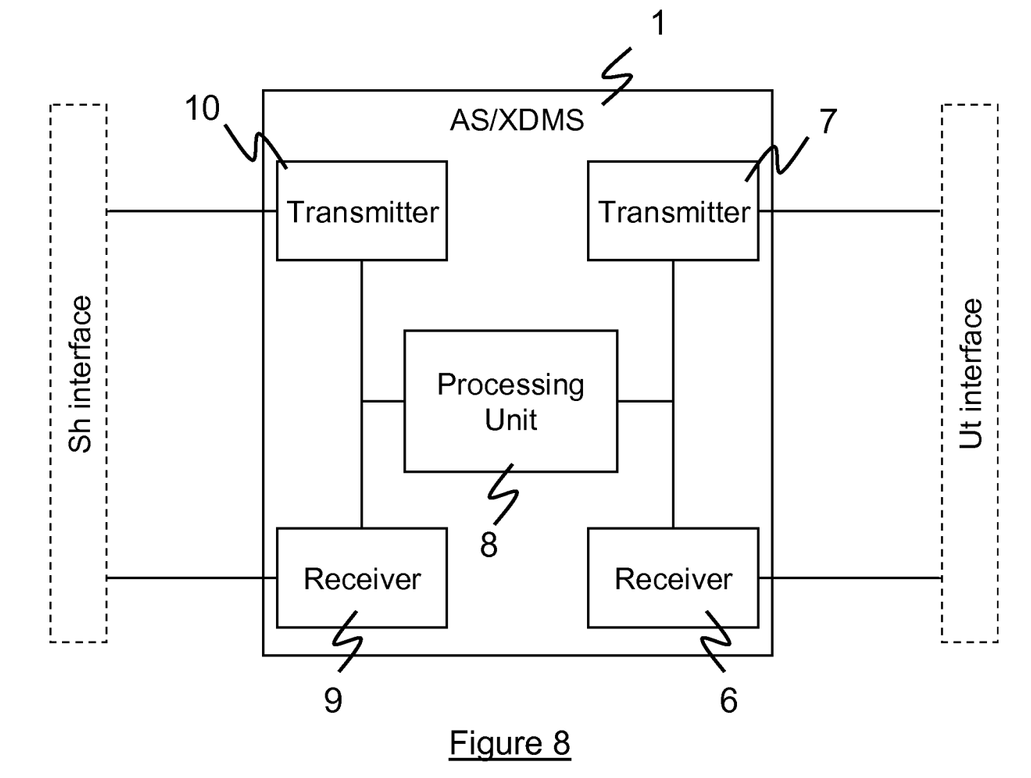
FIG. 8 illustrates schematically an example of an AS/XDMS according to an embodiment of the present invention.

FIG. 8 illustrates schematically an example of an AS/XDMS 1 suitable for implementing the method described above. The AS/XDMS 1 can be implemented as a combination of computer hardware and software. The AS/XDMS 1 comprises a receiver 6 for receiving messages sent from a user terminal over the Ut interface, a transmitter 7 for sending messages to the user terminal over a Ut interface, and a processing unit 8 for determining if the structure of an XML document for a service stored at a HSS differs from the structure required by or received from a user terminal and, if so, for translating the between the two structures. The AS/XDMS also has a receiver 9 and a transmitter 10 for retrieving XML documents from and storing XML documents at a HSS over a Sh interface.

Figure 9:
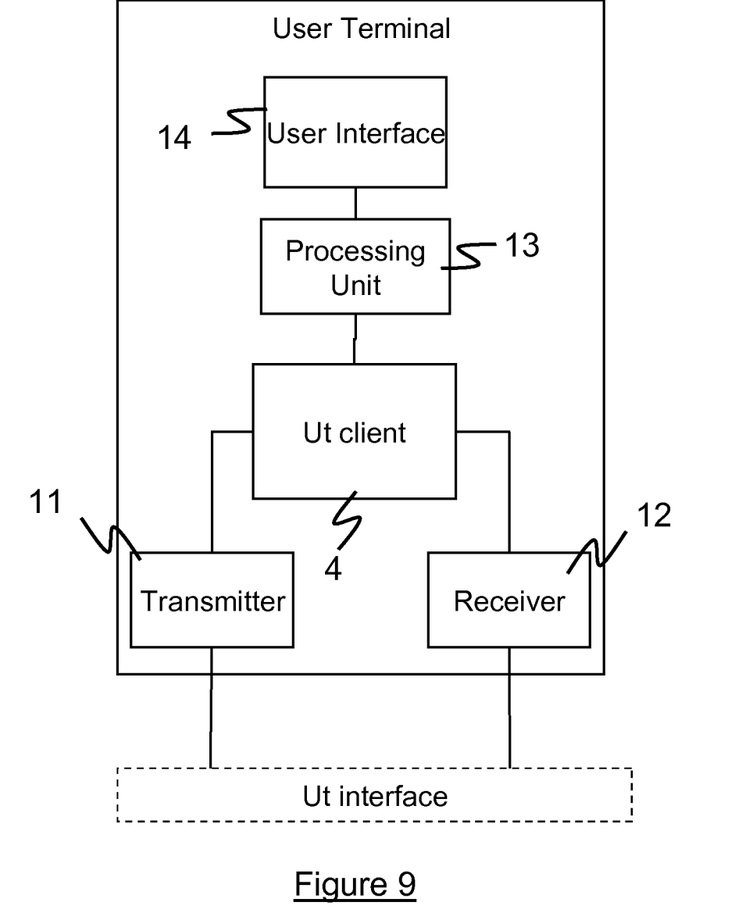
FIG. 9 illustrates schematically an example of a user terminal according to an embodiment of the present invention.

FIG. 9 illustrates schematically an example of a user terminal suitable for implementing the method described above. The user terminal can be implemented as a combination of computer hardware and software. The user terminal comprises a Ut client 4, a transmitter 11 for sending messages to an XML Document Management Server, a receiver 12 for receiving messages from an XML Document Management Server, a processor unit 13 and a user interface 14.

It will be appreciated by the person of skill in the art that various modifications may be made to the above-described embodiments without departing from the scope of the present invention. For example, in the embodiments described above the service data is stored in the HSS; however, the service data may be stored at an entity other than the HSS.

The invention claimed is:

1. A method of operating an XML Document Management Server provided within an IP Multimedia Subsystem, the method comprising:
receiving a message from a user terminal requesting an XML document, the XML document conforming to a given structure defined by an XML schema and containing one or more service rules relating to a service;
retrieving the XML document containing said service rules from a data storage entity;
if the structure of the retrieved XML document differs from said given structure, adapting a rule or rules of the retrieved XML document such that the XML document conforms to said given structure;
sending the adapted XML document to the user terminal;
prior to receiving said message requesting an XML document:
receiving a message from the user terminal requesting a list of the XML documents available for the service;
sending a message to the user terminal including a list of XML documents that the XML Document Management Server can provide for said service, the XML documents in the list presenting said service rules in respective different structures; and
receiving another message from the user terminal which includes a URI of an XML document selected from the list, the URI being used to determine the schema.

2. A method as claimed in claim 1, further comprising:
receiving a message from the user terminal including an XML document, and requesting that said XML document be stored; and
if the structure of the received XML document differs from the structure of an XML document relating to that service stored at a data storage entity, adapting a rule or rules of the received XML document such that the structure conforms to that of the stored XML document, and storing the adapted XML document at the data storage entity.

3. A method as claimed in claim 1, wherein the step of adapting a rule or rules of the retrieved XML document comprises:
replacing or removing those elements or attributes of the rule or rules of the retrieved XML document that differ from elements or attributes of the rule or rules of the given structure.

4. A method as claimed in claim 1, wherein the given structure is a structure supported by the user terminal.

5. A method as claimed in claim 4 wherein those elements or attributes of the rule or rules of the retrieved XML document that differ from elements or attributes of the rule or rules of the given structure relate to services or service levels not supported by the user terminal.

6. A method as claimed in claim 4, wherein those elements or attributes of the rule or rules of the retrieved XML document that differ from elements or attributes of the rule or rules of the given structure are replaced with one or more parameters that are supported by the user terminal.

7. A method as claimed in claim 1, wherein communication between the user terminal and the XML Document Management Server uses a Ut interface.

8. A method as claimed in claim 1, wherein communication between the user terminal and the XML Document Management Server and relating to service data in an XML document uses the XML Configuration Access Protocol.

9. A method as claimed in claim 1, wherein the data storage entity is a Home Subscriber Server.

10. A method as claimed in claim 9, wherein communication between the XML Document Management Server and the Home Subscriber Server uses a Sh interface.

11. An apparatus configured to operate as an XML Document Management Server provided within an IP Multimedia Subsystem, the apparatus comprising:
- a receiver for receiving a message from a user terminal requesting an XML document, the XML document conforming to a given structure and containing one or more service rules relating to a service;
- a transceiver for retrieving an XML document containing said service rules from a data storage entity;
- a processing unit, including a processor, for determining if the structure of the retrieved XML document differs from said given structure and, if so, for adapting a rule or rules of the retrieved XML document such that the structure conforms to said given structure;
- wherein the transmitter is further configured for sending a message including the adapted XML document to the user terminal;
- wherein the receiver is further configured for receiving a message from the user terminal requesting a list of the XML documents available for said service;
- wherein the transmitter is further configured for sending a message to the user terminal including a list of XML documents the XML Document Management Server can provide for said service, the XML documents in the list presenting said service rules in respective different structures; and
- wherein the receiver is further configured for receiving another message from the user terminal which includes a URI of an XML document selected from the list, the URI being used to determine the schema.

12. An apparatus as claimed in claim 11, wherein:
- the receiver is configured to receive a message from the user terminal including an XML document, and to request that the XML document be stored;
- the processing unit is configured to determine if the structure of the received XML document differs from the structure of an XML document relating to that service stored at a data storage entity and, if so, to adapt a rule or rules of the received XML document such that the structure matches that of the stored XML document; and
- the transmitter is configured to store the adapted XML document at the data storage entity.

* * * * *